(12) United States Patent
Dankowski

(10) Patent No.: US 9,377,281 B2
(45) Date of Patent: Jun. 28, 2016

(54) PRECISION TOOL FOR LOCATING CENTER LINES IN GEOMETRIC SHAPES

(71) Applicant: James Dankowski, Spring Hill, FL (US)

(72) Inventor: James Dankowski, Spring Hill, FL (US)

(*) Notice: Subject to any disclaimer, the term of this patent is extended or adjusted under 35 U.S.C. 154(b) by 79 days.

(21) Appl. No.: 14/578,824

(22) Filed: Dec. 22, 2014

(65) Prior Publication Data

US 2015/0176957 A1  Jun. 25, 2015

Related U.S. Application Data

(60) Provisional application No. 61/964,082, filed on Dec. 23, 2013.

(51) Int. Cl.
*G01B 3/38* (2006.01)
*G01B 3/00* (2006.01)

(52) U.S. Cl.
CPC .................................... *G01B 3/00* (2013.01)

(58) Field of Classification Search
CPC .................................... B25H 7/04; G01B 3/38
USPC .............. 33/465, 558.01, 666, 670, 671, 672, 33/783
See application file for complete search history.

(56) References Cited

U.S. PATENT DOCUMENTS

| | | |
|---|---|---|
| 50,173 A | 9/1865 | Shurtleff |
| 230,420 A | 7/1880 | Kahle |
| 230,421 A | 7/1880 | Kahle |
| 311,619 A * | 2/1885 | Varnum .................. B25D 5/00 33/672 |
| 341,714 A | 5/1886 | Albet |
| 409,828 A | 8/1889 | Connett |
| 608,183 A | 8/1898 | Davis |
| 723,720 A | 3/1903 | Ostlund |
| 742,665 A | 10/1903 | Jeffords |
| 762,553 A | 6/1904 | Palmer |
| 772,334 A | 10/1904 | Bornheimer |
| 780,190 A | 1/1905 | Jelsma |
| 804,571 A | 11/1905 | Amendt |
| 809,887 A | 1/1906 | Amendt |
| 970,817 A | 9/1910 | Harris |
| 984,697 A | 2/1911 | Pfaff |
| 1,108,706 A | 8/1914 | Coffman |
| 1,150,556 A | 8/1915 | Thomson |
| 1,201,342 A | 10/1916 | Peck |
| 1,286,748 A | 12/1918 | Ozerowicz |
| 1,300,122 A | 4/1919 | Chiodo |
| 1,370,311 A | 3/1921 | Harris |
| 1,388,705 A | 8/1921 | Harris |

(Continued)

FOREIGN PATENT DOCUMENTS

| | | |
|---|---|---|
| GB | 2229272 A | 9/1990 |
| GB | 2232125 A | 12/1990 |

(Continued)

*Primary Examiner* — G. Bradley Bennett
(74) *Attorney, Agent, or Firm* — Husch Blackwell LLP

(57) ABSTRACT

The disclosed invention relates to easy-to-use precision tools that locate the mid-line, or center line, of any symmetrical geometric shape, such as triangles, squares, circles, rectangles, parallelograms, trapezoids, and symmetrical polygons. Given two separate points on the edge of a symmetrical geometric shape, these precision tools identify the center line of the geometric shape between those two points, without the need for additional measurements or mathematical calculations. The precision tools can also be used to identify the center points of symmetrical geometric shapes.

28 Claims, 4 Drawing Sheets

(56) References Cited

U.S. PATENT DOCUMENTS

| | | | |
|---|---|---|---|
| 1,396,417 A | | 11/1921 | Gepack |
| 1,434,900 A | | 11/1922 | Lavimodiere |
| 1,454,782 A | * | 5/1923 | Wimmer .................. B25D 5/02 33/42 |
| 1,549,947 A | * | 8/1925 | Wolfe ...................... B25D 5/02 33/428 |
| 1,630,505 A | | 5/1927 | Walther |
| 1,708,191 A | | 4/1929 | Riedel |
| 1,718,868 A | | 6/1929 | Meadows |
| 1,809,775 A | | 6/1931 | Daehlin |
| 1,903,393 A | | 4/1933 | Vicek |
| 2,243,201 A | | 5/1941 | Fornelius |
| D141,088 S | * | 5/1945 | Boyce ............................. 33/451 |
| 2,547,354 A | | 4/1951 | Worden |
| 2,748,491 A | | 6/1956 | Tauber |
| 2,865,106 A | | 12/1958 | Murdoch |
| 3,075,294 A | * | 1/1963 | Strecker ............. B23Q 17/2275 33/644 |
| 3,173,211 A | * | 3/1965 | Williams ............... G01C 15/10 33/27.03 |
| 3,214,835 A | | 11/1965 | Barquero |
| 3,226,834 A | | 1/1966 | Siemers |
| 3,271,869 A | | 9/1966 | Ratner |
| 3,354,551 A | | 11/1967 | Overby |
| 4,416,063 A | * | 11/1983 | Nestor ..................... G01B 3/38 33/663 |
| D274,414 S | | 6/1984 | Audsley |
| 5,154,003 A | | 10/1992 | Moore |
| 5,398,577 A | * | 3/1995 | Pierce .................. A01G 23/099 144/335 |
| 5,430,954 A | * | 7/1995 | Best ..................... A61B 5/0053 33/784 |
| 5,475,931 A | | 12/1995 | Wei |
| 5,875,561 A | | 3/1999 | Chen |
| 6,854,196 B2 | | 2/2005 | Burrell et al. |
| 2001/0037581 A1 | * | 11/2001 | Akhavan-Sigari ... A61B 5/1071 33/807 |
| 2003/0000098 A1 | * | 1/2003 | Mackin .................... G01B 3/16 33/558.01 |
| 2003/0121164 A1 | * | 7/2003 | Kraus .................. B43L 13/001 33/520 |
| 2005/0044740 A1 | | 3/2005 | Hansen |
| 2013/0118022 A1 | * | 5/2013 | Propp ...................... B25H 7/04 33/669 |
| 2015/0096179 A1 | * | 4/2015 | Courtney ............... B25H 7/04 33/194 |

FOREIGN PATENT DOCUMENTS

| | | |
|---|---|---|
| JP | 62-200202 | 9/1987 |
| JP | 62200202 | 9/1987 |

\* cited by examiner

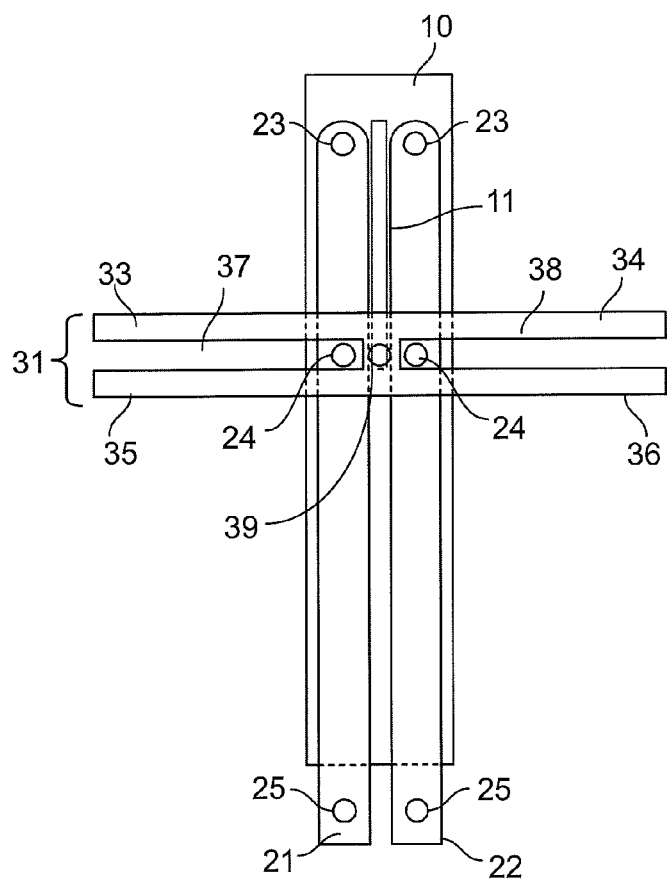 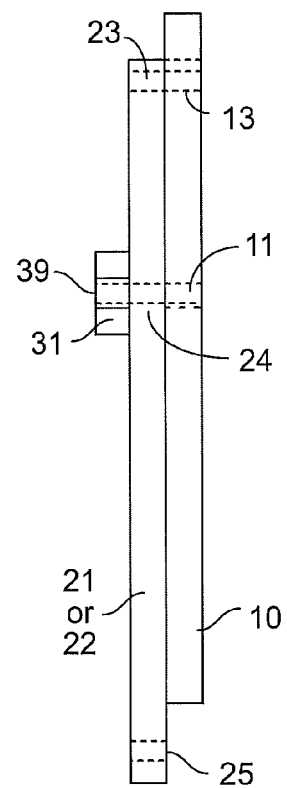
FIG. 2  FIG. 3

PRECISION TOOL FOR LOCATING CENTER LINES IN GEOMETRIC SHAPES

FIELD

This invention relates to simple, easy-to-use precision tools that precisely locate the mid-line, or center line, of any symmetrical geometric shape, such as squares, circles, rectangles, parallelograms, and trapezoids. The invention is a single object wherein contact members locate or check the center of a hole or the location of a center line, without the need for measurements or mathematical calculations.

BACKGROUND OF THE INVENTION

There is a need for a simple-to-use, precision tool that accurately identifies the center lines and center points of a variety of geometric shapes, requiring no more than simple manual manipulations by the user to determine the center lines with mathematical precision.

Precision tools exist that can be used to identify the center lines of different geometric shapes, but those instruments are limited in several ways. Similar instruments that are easy to operate incorporate sophisticated construction or automation to identify center lines with mathematical precision. Some manually operated tools yield imprecise approximations of center lines or center points. Other manually operated tools identify center lines or center points with mathematical precision, but require precise measurements or mathematical calculations by the user. Accordingly, there is an urgent need for a simple, manually operated precision tool that will identify the center lines of symmetrical geometric shapes with mathematical precision, without requiring the user to make mathematically precise measurements or calculations.

Other similar precision tools are complex constructions requiring power gears and additional pieces for assembly and function. There is a need for a precision tool that determines center lines without the use of automated parts, such as a power-screw mechanism. By simply placing the positioning legs of the precision tool on the edges of a geometric shape, the center is immediately indicated without any further adjustments to position the centering leg or by means of an adjustment screw. This provides a precision tool that is easier to use, and has a design that requires only a few, non-automated parts. Furthermore, this precision tool does not require a power source for operation.

There also exist other instruments that could be adapted to identifying the precise center lines of only a few geometric shapes, or only one geometric shape. There exists a need for a precision tool that identifies the center lines of a variety of different symmetrical geometric shapes.

Precision tools that identify the center lines of symmetrical geometric shapes operate in a plane that is substantially perpendicular to the geometric shapes. There exists a further need for precision tools that are operated in a plane that is substantially parallel to the geometric shapes, particularly in circumstances where space limitations prevent the use of a substantially perpendicular tool.

SUMMARY OF THE INVENTION

The disclosed embodiments include a precision tool comprising a base leg, two slidingly adjustable positioning legs, and a means of orienting the positioning legs relative to the base leg so that the base leg forms the center line between the two portioning legs. Accordingly, when the positioning legs are placed upon two separate points on the edge of a geometric shape, the base leg identifies the center line of that geometric shape between those two points, without additional measurements, manipulations, or mathematical calculations.

The disclosed invention relates to precision tools that precisely locate the center line of a geometric shape. Unlike a compass, which is a two-legged instrument, the disclosed precision tools comprise a central base leg with two flanking positioning legs that are slidingly attached to the base leg. When the ends of the positioning legs are placed upon two separate points on the edge of the geometric shape, the base leg defines the center line of the geometric shape, without further measurements or mathematical calculations.

To precisely define the center line of a geometric shape, the base leg is maintained in a particular orientation relative to the two positioning legs. The base leg is restricted to maintaining an orientation in which the base leg bisects the angle formed by its two flanking positioning legs. As the positioning legs move outward from the base leg (or inward toward it), the first positioning leg forms an angle with the base leg that is the same as the angle formed by the second positioning leg and the base leg. This feature ensures the mathematical precision of the center line identified by the disclosed invention.

The precision tool can be used to identify multiple center lines for the same geometric shape, and can identify the center line for every axis of symmetry that a geometric shape possesses. In addition, by plotting two or more center lines, the center point of a geometric shape is identified by the intersection of those center lines, with mathematical precision.

One embodiment of the invention further comprises a central leg. The central leg provides means to maintain the positioning legs in a particular orientation relative to the base leg, so that the precision tool accurately identifies the center line between the two separate points on the edge of a geometric shape that are indicated with the positioning legs.

Another embodiment of the invention further comprises a simple planetary gear system, instead of a central leg, to ensure that the positioning legs maintain the correct orientation relative to the base leg. In this way, the base leg and positioning legs maintain the necessary orientation so that the precision tool accurately identifies the center line between two separate points on the edge of a geometric shape. The planetary gear system provides an alternative means of adjusting the positioning legs to maintain the required orientation relative to the base leg.

Another embodiment of the invention further comprises gears to ensure that the positioning legs maintain the correct orientation relative to the base leg. The interlocking gears maintain the required orientation that ensures that the base leg of the precision tool accurately identifies the center line between two separate points on the edge of a geometric shape.

BRIEF DESCRIPTION OF THE DRAWINGS

FIG. 2 is an illustration of a precision tool with a central leg according to the disclosed embodiments, where the positioning legs are in a closed position.

FIG. 3 is a side view of the precision tool with a central leg.

DETAILED DESCRIPTION

A "geometric shape" is any closed, two-dimensional shape having at least one axis of symmetry. Examples of geometric shapes include, but are not limited to, squares, rectangles, parallelograms, trapezoids, ellipses, ovals, and circles. Other examples include pentagons, hexagons, and other polygons, as long as they have at least one axis of symmetry.

A "center line" is any line which forms an axis of symmetry in a geometric shape. A center line divides a geometric shape into two halves. Each half possesses equal area to each other and is a mirror image of the other half.

The disclosed embodiments of the invention relate to a precision tool that readily identifies the center line between two separate points on the edge of a geometric shape.

Embodiment 1

FIGS. 1-6 illustrate one embodiment of a precision tool of the disclosure. The embodiment shown in FIGS. 1-2 includes a base leg 10, two positioning legs 21, 22 attached next to each other atop the base leg 10, and a central leg 31 atop the two positioning legs 21, 22.

Figures 6A, 6B:
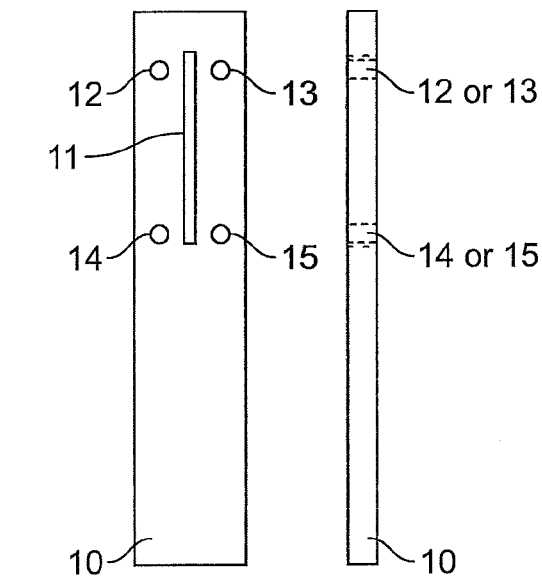
FIGS. 6A-6B illustrate a top and side view of the base leg of the precision tool.

The base leg 10 is shown in greater detail in FIGS. 6A-6B. The base leg 10 contains a thru slot 11 positioned in its midline and four openings 12-15.

Figure 1:
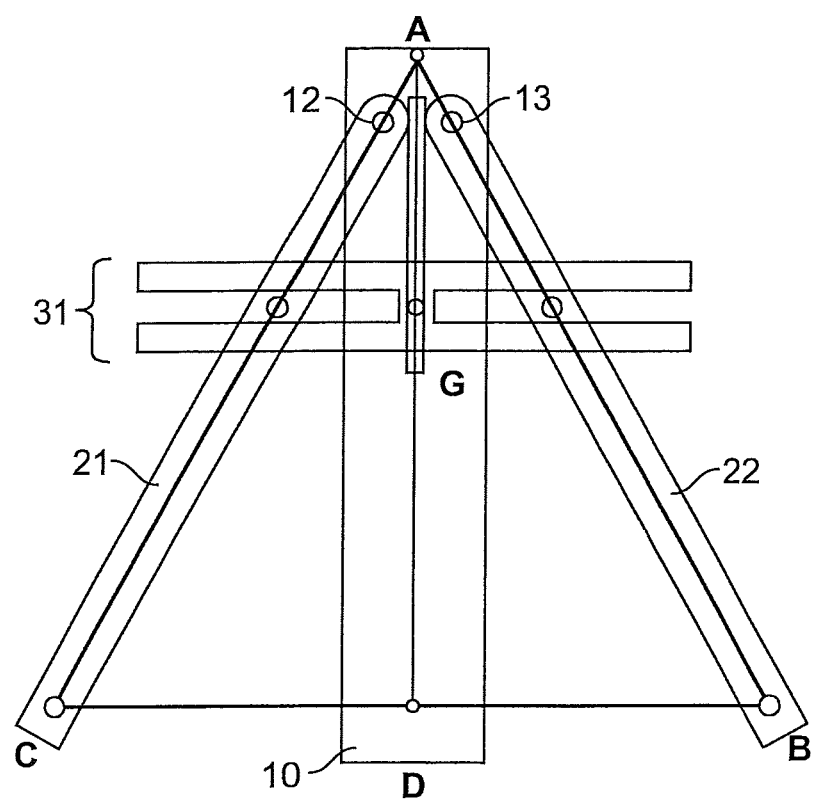
FIG. 1 is an illustration of a precision tool with a central leg according to the disclosed embodiments, where the positioning legs are in an opened position.
Figures 4A, 4B, 5A, 5B:
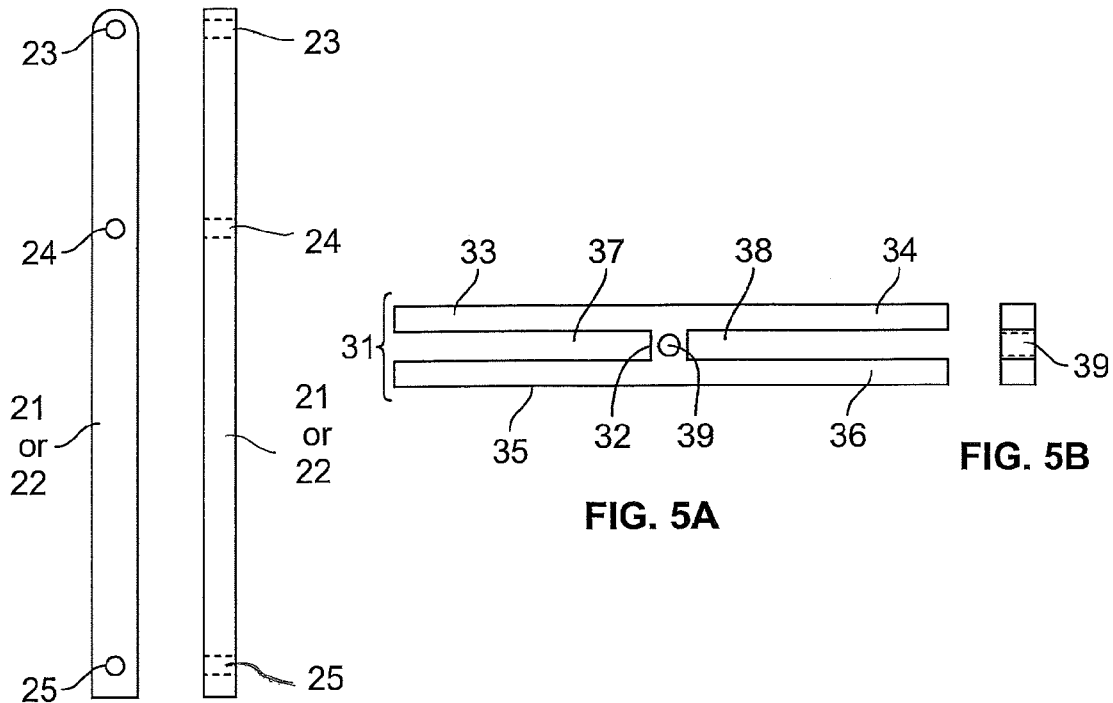
FIGS. 4A-4B are top and side views of a positioning leg of the precision tool.
FIGS. 5A-5B are top and side views of the central leg of the precision tool.

The two positioning legs 21, 22 are identical in structure and shown in greater detail in FIGS. 4A-4B. Each positioning leg 21, 22 has three openings 23-25. The first positioning leg 21 is slidingly attached atop the base leg 10 by a fastening means through opening 12 of the base leg 10 and opening 23 of the first positioning leg 21. The second positioning leg 22 is slidingly attached atop the base leg 10 by a fastening means through opening 13 of the base leg 10 and opening 23 of the second positioning leg 22.

The first positioning leg 21 slidingly attaches to the base leg 10 at opening 12. The second positioning leg 22 slidingly attaches to the base leg 10 at opening 13.

This embodiment of the precision tool also includes a central leg 31, which is shown in greater detail in FIGS. 5A-5B. The central leg 31 is shaped like an capital letter "H" with elongated arms 33-36. There is an open section 37 between elongated arms 33 and 35. There is another open section 38 between elongated arms 34 and 36. The crosspiece 32 of the central leg contains an opening 39.

This embodiment is assembled as the base leg 10, two positioning legs 21, 22 attached next to each other atop the base leg 10, and a central leg 31 atop the two positioning legs 21, 22.

FIGS. 2-3 further illustrate the assembled precision tool. When assembled, first positioning leg 21 and second positioning leg 22 lie atop the base leg 10, with thru slot 11 between them (FIG. 2). Opening 23 of the first positioning leg 21 will be slidingly fastened to opening 12 of the base leg 10 and opening 23 of the second positioning leg 22 will be slidingly fastened to opening 13 of the base leg 10. Opening 24 of the first positioning leg 21 will align to opening 14 of the base leg 10 and opening 24 of the second positioning leg 22 will align to opening 15 of the base leg 10. Opening 25 of each positioning leg 21, 22 will extend past the base leg 10.

The central leg 31 slidingly attaches to the base leg 10 by a fastening means through opening 39 of the central leg 31 and thru slot 11 of the base leg 10. The fastening means, for example, a pin, allows the central leg 31 to move laterally along the thru slot 11, along the midline of the base leg 10. (FIG. 2).

As the two positioning legs 21, 22 move outward from the midline of the base leg 10 (or inward toward it), opening 24 of the first positioning leg 21 must be kept in alignment with opening 24 of the second positioning leg 22, so that a line formed between the two openings is perpendicular to thru slot 11 of the base leg 10. This restriction maintains the two positioning legs 21, 22 in proper alignment with the base leg 10 (FIGS. 2-3), so that the angles formed between the base leg and each positioning leg are angles of equal size and, accordingly, the base leg 10 identifies the center line of a geometric shape.

This embodiment of the precision tool can be used to find the center line between two separate points on a geometric shape. To do so, opening 25 of the first positioning leg must be positioned above one point along the edge of the geometric shape and opening 25 of the second positioning leg must be positioned above another point along the edge of the geometric shape. The central leg must be positioned such that opening 24 of the first positioning leg is contained within open section 37 of the central leg and opening 24 of the second positioning leg is contained within open section 38 of the central leg. With the precision tool thus aligned, the base leg will identify the center line between the two points of the geometric figure with mathematical precision.

Embodiment 2

Figure 7:
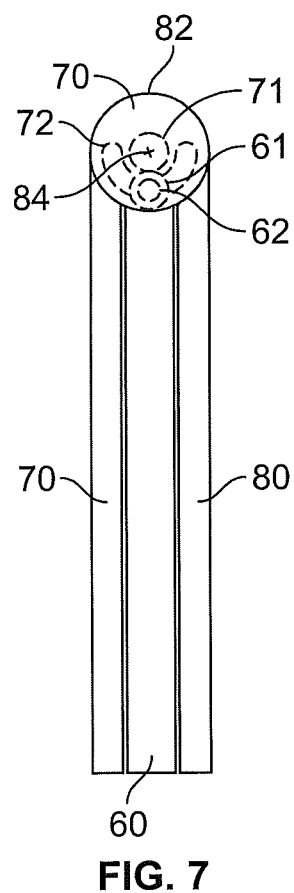
FIG. 7 is an illustration of a further embodiment of a precision tool containing a planetary gear system.

FIG. 7 illustrates an example of an alternative embodiment of a precision tool of the disclosure. In this embodiment, the relative alignment of the base leg and two positioning legs are maintained by means of simple planetary gear system, instead of the central leg piece described in Embodiment 1.

This precision tool is made of a base leg 60, a first positioning leg 70, and a second positioning leg 80 that are aligned by a simple planetary system. The simple planetary system has a sun gear 71, planet gear 61, curved groove 72, and ring gear 82.

The base leg 60 forms the bottom piece of the precision tool. The planet gear 61 is attached atop the base leg 60 near the base leg's apex. The planet gear 61 is attached at point 62 so that the planet gear can only rotate around its own center.

First positioning leg 70 contains a curved groove 72 near its apex. A sun gear 71 is fastened atop first positioning leg 70, positioned closer to the apex than the curved groove 72. The curved groove 72 describes a partial orbit around the sun gear 71.

First positioning leg 70 is placed atop base leg 60 so that the planet gear 61 protrudes upward through the curved groove 72. The teeth of planet gear 61 contact the teeth of the sun gear 71. The ring gear 82 encircles the sun gear 71, the planet gear 61, and the curved groove 72. The inner teeth of the ring gear 82 contact the teeth of the planet gear 61.

The second positioning leg 80 is placed atop the first positioning leg 70 and the ring gear 82, near the apex of the second positioning leg 80. The precision tool is fastened together at a single point 84, attached by a fastening means through the second positioning leg 80, the center of the sun gear 71, the first positioning leg 70, and the base leg 60.

The planetary gear system functions to restrict the movement of the first positioning leg 70 and second positioning leg 80 so that whenever one positioning leg is moved away (or toward) the base leg, the other positioning leg also moves the same distance away (or toward) the base leg 60. Thus, the unattached ends of the first positioning leg 70 and the second positioning leg 80 always remain equidistant from the base leg 60. Also, the interior angle between the base leg 60 and the first positioning leg 70 always remains the same size as the interior angle between the base leg 60 and the second positioning leg 80. Accordingly, the planetary gear system maintains the required orientation between the base leg and the two positioning legs to ensure that the precision tool identifies a geometric shape's center line with mathematical precision.

This embodiment of the precision tool can be used to find the center line between two separate points on a geometric shape. To do so, the unattached ends of the first positioning leg 70 and the second positioning leg 80 are extended outward and placed on two separate points along the edge of the geometric shape. With the precision tool thus aligned, the base leg 60 will identify the center line between the two points of the geometric figure.

Embodiment 3

Figure 8A:
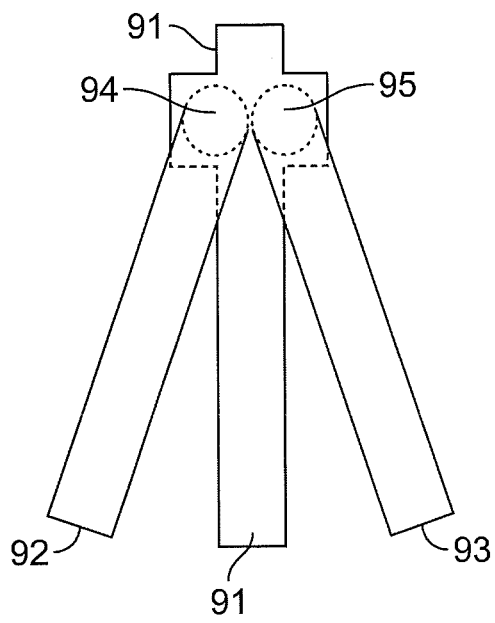
FIGS. 8A-8B illustrate a further embodiment of a precision tool containing gears in an opened position and a closed position.
Figure 8B:
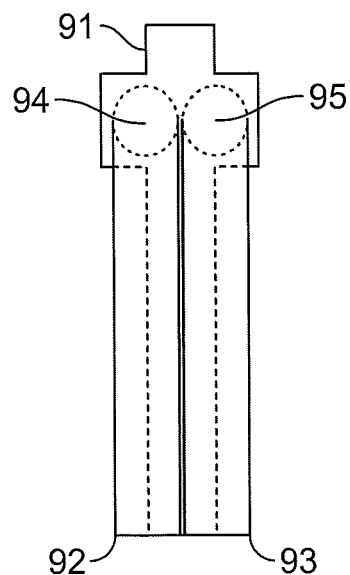

FIGS. 8A-8B illustrate an example of an alternative embodiment of a precision tool of the disclosure. In this embodiment, the relative alignment of the base leg and two positioning legs are maintained by means of gears, instead of the central leg piece described in Embodiment 1 or the simple planetary gear system described in Embodiment 2.

This precision tool is made of a base leg 91, a first positioning leg 92, and a second positioning leg 93 that are aligned with gears 94, 95. The first positioning leg 92 is slidingly attached atop the base leg 91 near its apex by means of a gear 94 sandwiched between them. The second positioning leg 93 is slidingly attached atop the base leg 91 near its apex by means of a gear 95 sandwiched between them. Gear 94 is identical to gear 95 and the teeth of the two gears contact each other. The first positioning leg 92 and second positioning leg 93 are the same length.

The gears function to restrict the movement of the first positioning leg 92 and second positioning leg 93 so that whenever one positioning leg is moved away (or toward) the base leg 91, the other positioning leg also moves the same distance away (or toward) the base leg. Thus, the unattached ends of the first positioning leg 92 and the second positioning leg 93 always remain equidistant from the base leg 91. Also, the interior angle between the base leg 91 and the first positioning leg 92 always remains the same size as the interior angle between the base leg 91 and the second positioning leg 93. Accordingly, the gears maintain the required orientation between the base leg and the two positioning legs to ensure that the precision tool identifies a geometric shape's center line with mathematical precision.

This embodiment of the precision tool can be used to find the center line between two separate points on a geometric shape. To do so, the unattached ends of the first positioning leg 92 and the second positioning leg 93 are placed on two separate points along the edge of the geometric shape. With the precision tool thus aligned, the base leg 91 will identify the center line between the two points of the geometric figure.

What is claimed is:

1. A precision tool for locating a center line of a geometric shape, comprising:
   a) a base leg with a slot along a midline of the base leg, a first plurality of openings generally parallel to the slot, and a second plurality of openings generally parallel to the midline of the base leg;
   wherein the first plurality of openings are positioned in precise alignment with the second plurality of openings, and
   wherein the slot lies between the first plurality of openings and the second plurality of openings;
   b) a pair of positioning legs that are longer than the base leg, each positioning leg further comprising a plurality of openings in the precise alignment with a plurality of first openings in the base leg, plus a second opening at a distal end of the positioning leg; and
   d) a central leg shaped like an elongated capital letter "H"; and
   e) a fastener;
   wherein each positioning leg is slidingly attached adjacent to the base leg, such that the plurality of first openings in each positioning leg is in alignment with either the first plurality of openings of the base leg or the second plurality of openings of the base leg, the slot of the base leg runs between the pair of positioning legs, and the second opening extends past a bottom edge of the base leg;
   wherein the fastener slidingly attaches the central leg to the slot of the base leg, such that the fastener can move along the slot, the central leg is positioned adjacent to the pair of positioning legs and perpendicular to the slot; and
   wherein the distance between the second opening of one positioning leg and the midline of the base leg is equal to the distance between the second opening of the other positioning leg and the midline of the base leg.

2. The precision tool as in claim 1, wherein the midline of the base leg contains a means for marking a midline of the geometric shape.

3. The precision tool as in claim 1, wherein the means for marking the midline of the geometric shape comprises at least one element selected from the group of: at least one slot, at least one notch, and at least one opening.

4. The precision tool as in claim 2, wherein the means for marking the midline of the geometric shape comprises at least one element selected from the group of: at least one slot, at least one notch, and at least one opening.

5. The precision tool as in claim 1, wherein the pair of positioning legs are attached to the base leg with pins.

6. The precision tool as in claim 2, wherein the pair of positioning legs are attached to the base leg with pins.

7. The precision tool as in claim 3, wherein the pair of positioning legs are attached to the base leg with pins.

8. The precision tool as in claim 1, wherein the base leg is substantially flat and the sides of the positioning legs adjacent to the base leg are substantially flat.

9. The precision tool as in claim 2, wherein the base leg is substantially flat and the sides of the positioning legs adjacent to the base leg are substantially flat.

10. The precision tool as in claim 3, wherein the base leg is substantially flat and the sides of the positioning legs adjacent to the base leg are substantially flat.

11. A precision tool for locating a center line of a geometric shape, comprising a base leg and a pair of positioning legs that are slidingly attached to the base leg by a planetary gear system further comprising a sun gear, planet gear, and ring gear;
   the base leg is leg is attached to the planet gear, such that the planet gear is adjacent to the base leg and attached to limit the motion of the planet gear to rotation around a center of the gear;
   a first positioning leg further comprises a curved groove and is positioned adjacent to the base leg such that the planet gear protrudes through the curved groove;

the sun gear is attached adjacent to the first positioning leg such that the sun gear engages the planet gear;

the ring gear encircles the sun gear and planet gear, so that the sun gear, planet gear, and ring gear form a planetary gear set, and a second positioning leg is connected to the ring gear, the base leg, first positioning leg, and second positioning leg are all attached to each other through an axis around which the sun gear rotates;

a free end of the base leg is between a free end of the first positioning leg and a free end of the second positioning leg;

wherein the distance between the second end of the first positioning leg and a center of the sun gear is equal to the distance between the distance between the second end of the second positioning leg and the center of the sun gear; and the distance between the second end of the first positioning leg and the second end of the base leg is always equal to the distance between the second end of the second positioning leg and the second end of the base leg.

12. The precision tool as in claim 11 wherein the planet gear is connected to the base leg with a pin.

13. The precision tool as in claim 11 wherein the base leg, first positioning leg, and second positioning leg are attached to each other with a pin.

14. The precision tool as in claim 12 wherein the base leg, first positioning leg, and second positioning leg are attached to each other with a pin.

15. A precision tool for locating a center line of a geometric shape, comprising:
  a base leg;
  a first gear wherein a bottom face of the first gear is attached to the top surface of the base leg through a center of the first gear;
  a second gear wherein a bottom face of the first gear is attached to the top surface of the base leg through a center of the second gear, and
    wherein the first gear engages the second gear for rotational motion;
  a first positioning leg attached to the first gear, such that the first gear is between the base leg and the first positioning leg, and the first gear can rotate;
  a second positioning leg attached to the second gear, such that the second gear is between the base leg and the first positioning leg, and the second gear can rotate;
  wherein the first gear and second gear have a 1:1 gear ratio; and
  wherein the distance between the base leg and the unattached end of the first positioning leg is equal to the distance between the base leg and the unattached end of the second positioning leg.

16. The precision tool as in claim 15, wherein a midline of the long axis of the base leg contains a means for marking the midline of the long axis of the base leg.

17. The precision tool as in claim 15, wherein the means for marking the midline of the base leg comprises at least one element selected from the group of: at least one slot, at least one notch, and at least one opening.

18. The precision tool as in claim 16, wherein the means for marking the midline of the base leg comprises at least one element selected from the group of: at least one slot, at least one notch, and at least one opening.

19. The precision tool as in claim 15,
  wherein the base leg, first gear, and first positioning leg are attached with a pin, and
  wherein the base leg, second gear, and second positioning leg are attached with a pin.

20. The precision tool as in claim 16,
  wherein the base leg, first gear, and first positioning leg are attached with a pin, and
  wherein the base leg, second gear, and second positioning leg are attached with a pin.

21. The precision tool as in claim 17,
  wherein the base leg, first gear, and first positioning leg are attached with a pin, and
  wherein the base leg, second gear, and second positioning leg are attached with a pin.

22. The precision tool as in claim 15, wherein the base leg further comprises a cruciform shape.

23. The precision tool as in claim 16, wherein the base leg further comprises a cruciform shape.

24. The precision tool as in claim 17, wherein the base leg further comprises a cruciform shape.

25. The precision tool as in claim 18, wherein the base leg further comprises a cruciform shape.

26. The precision tool as in claim 19, wherein the base leg further comprises a cruciform shape.

27. The precision tool as in claim 20, wherein the base leg further comprises a cruciform shape.

28. The precision tool as in claim 21, wherein the base leg further comprises a cruciform shape.

* * * * *